US010235315B2

United States Patent
Kishi et al.

(10) Patent No.: US 10,235,315 B2
(45) Date of Patent: Mar. 19, 2019

(54) COMMUNICATION SYSTEM, CONTROL APPARATUS, AND MANAGEMENT APPARATUS FOR WAVEFORM ADJUSTMENT BASED ON CABLE TYPES

(71) Applicant: FUJITSU LIMITED, Kawasaki-shi, Kanagawa (JP)

(72) Inventors: Yusuke Kishi, Kahoku (JP); Yuki Hirano, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 461 days.

(21) Appl. No.: 15/138,263

(22) Filed: Apr. 26, 2016

(65) Prior Publication Data

US 2016/0321209 A1   Nov. 3, 2016

(30) Foreign Application Priority Data

Apr. 30, 2015   (JP) .................. 2015-093425

(51) Int. Cl.
*G06F 13/40* (2006.01)
*H04L 25/03* (2006.01)
*G06F 13/42* (2006.01)

(52) U.S. Cl.
CPC ...... *G06F 13/4022* (2013.01); *G06F 13/4068* (2013.01); *G06F 13/4282* (2013.01);
(Continued)

(58) Field of Classification Search
None
See application file for complete search history.

(56) References Cited

U.S. PATENT DOCUMENTS 4,151,490 A * 4/1979 Bazin .................. H04N 7/102
333/16
5,343,236 A * 8/1994 Koppe .................. H04B 3/04
333/18
(Continued)

FOREIGN PATENT DOCUMENTS

JP   2005-339983       12/2005
JP   2009-187483 A      8/2009
(Continued)

OTHER PUBLICATIONS

'Wireline Equalization using Pulse-Width Modulation' by Jan-Rutger Schrader et al., IEEE, 2006 Custom Integrated Circuits Conference. (Year: 2006).*

(Continued)

*Primary Examiner* — Steven G Snyder
(74) *Attorney, Agent, or Firm* — Fujitsu Patent Center (57) ABSTRACT

By provided with a first extraction unit configured to extract a communication setting value corresponding to a communication cable provided to a first connector, from communication setting information, based on cable information gathered by a first gathering unit, a first setting unit configured to set the communication setting value, to a first storage device of a first communication switch, a first activation unit configured to activate a port of the first communication switch, and a first synchronization unit configured to cause a management apparatus to carry out an activation of a port of a second communication switch provided in a communication apparatus in synchronization with the activation of the port, the flexibility of configurations employing communication cables is improved.

10 Claims, 5 Drawing Sheets

(52) U.S. Cl.
CPC .. *H04L 25/03878* (2013.01); *H04L 25/03885* (2013.01); *G06F 2213/0026* (2013.01)

(56) References Cited

U.S. PATENT DOCUMENTS

| | | | | |
|---|---|---|---|---|
| 6,466,626 | B1* | 10/2002 | Cecchi | H04L 25/03885 333/24 R |
| 7,834,638 | B2* | 11/2010 | Kondo | H04L 25/028 324/527 |
| 7,852,781 | B1* | 12/2010 | Felton | H04L 41/12 326/27 |
| 8,302,137 | B2* | 10/2012 | Cagno | H04L 25/03878 711/114 |
| 8,564,328 | B2* | 10/2013 | Stojanovic | H04L 25/028 326/82 |
| 8,848,826 | B2* | 9/2014 | Lin | H04L 25/0264 326/21 |
| 2008/0056408 | A1* | 3/2008 | Mezer | H04L 25/03878 375/316 |
| 2008/0240288 | A1* | 10/2008 | Kondo | H04L 25/0272 375/297 |
| 2009/0204743 | A1 | 8/2009 | Inoue et al. | |
| 2013/0089122 | A1* | 4/2013 | Lin | H04L 25/0264 375/219 |
| 2013/0202016 | A1* | 8/2013 | Mohajeri | H04L 25/03878 375/219 |
| 2014/0025846 | A1 | 1/2014 | Miyauchi | |
| 2017/0017595 | A1* | 1/2017 | Schnell | G06F 13/385 |
| 2017/0090543 | A1* | 3/2017 | Thielo | G06F 1/3206 |
| 2017/0302486 | A1* | 10/2017 | Schulz | H04L 25/03 |
| 2018/0004618 | A1* | 1/2018 | Hirano | G06F 11/221 |
| 2018/0287239 | A1* | 10/2018 | Sundaram | H01P 3/10 |

FOREIGN PATENT DOCUMENTS

| | | |
|---|---|---|
| JP | 2014-002637 | 1/2014 |
| WO | 2012/131982 A1 | 10/2012 |

OTHER PUBLICATIONS

'Multiple-Valued data transmission based on time-domain pre-emphasis techniques in consideration of higher-order channel effects' by Yasushi Yuminaka et al., 39th International Symposium on Multiple-Valued Logic, copyright 2009, IEEE. (Year: 2009).*

'Phase and Amplitude Pre-Emphasis Techniques for Low-Power Serial Links' by James F. Buckwalter et al., IEEE Journal of Solid-State Circuits, vol. 41, No. 6, June 2006. (Year: 2006).*

Japanese Office Action dated Oct. 2, 2018 for corresponding Japanese Patent Application No. 2015-093425, with Partial English Translation, 6 pages.

* cited by examiner

|  | COPPER CABLE 1m | COPPER CABLE 3m | OPTICAL CABLE |
|---|---|---|---|
| OUTPUT VOLTAGE | 05h | 10h | 02h |
| OUTPUT PRE-EMPHASIS | 15h | 20h | 05h |
| INPUT EQUALIZER | 10h | 20h | 07h |

COMMUNICATION SYSTEM, CONTROL APPARATUS, AND MANAGEMENT APPARATUS FOR WAVEFORM ADJUSTMENT BASED ON CABLE TYPES

CROSS-REFERENCE TO RELATED APPLICATION

This application is based upon and claims the benefit of priority of the prior Japanese Patent application No. 2015-093425, filed on Apr. 30, 2015, the entire contents of which are incorporated herein by reference.

FIELD

The embodiments discussed herein relate to a communication system, a control apparatus, and a management apparatus.

BACKGROUND

A number of recent chip sets have Peripheral Component Interconnect Express (PCIe) buses for achieving fast-speed data transmissions. Meanwhile, a number of Redundant Arrays of Inexpensive Disks (RAID) apparatuses are often configured from multiple units, wherein the units are connected through midplanes, backplanes, and cables.

Among those, cables are employed for connections between enclosures. Although it is preferred that the lengths of cables employed for inter-enclosure connections are adjusted to optimum lengths in accordance with the distances between enclosures, the distances between enclosures depend on floor plans and thus cannot be determined unconditionally.

Additionally, in fast-speed data buses, waveforms are also required to be adjusted. The waveform adjustment is done by appropriately changing and setting the values of the output voltage, the input equalizer, and the output pre-emphasis, for example. If such values is too large or too small, the transmission quality reduces. Hence, it is important to set optimal values in accordance with the transmission distance and other parameters.

Some of devices including PCIe buses have a function to automatically adjust waveforms upon a connection. However, unlike PCIe, no standard for automatic adjustments of waveforms has been stipulated for optical cables, and thus no automatic adjustment of waveforms is available for optical cables. Even with Cu (copper) cables, stable connections may not be achieved under the influence of noises or other factors, due to device compatibility and device deviations.

Accordingly, in conventional RAID apparatuses, cables employed for inter-device connections have been limited and waveform setting values fixed for those cables have been set.

Patent Document 1: Japanese Laid-open Patent Application No. 2014-2637
Patent Document 2: Japanese Laid-open Patent Application No. 2005-339983

However, since only limited cables are employed in conventional RAID apparatuses, configurations employing such communication cables are not flexible in design and thus are inconvenient. For example, long cables are used even for connections between adjacent devices.

SUMMARY

According to an aspect of the embodiments, a communication system includes a control apparatus including a first connector; a communication apparatus that includes a second connector and is connected to the control apparatus through communication cables; and a management apparatus configured to control communications between the control apparatus and the communication apparatus, wherein the control apparatus includes: a first storage unit configured to store communication setting information about the communication cables in a plurality of types; a first gathering unit configured to gather cable information about the communication cables provided in the first connector of the control apparatus; a first extraction unit configured to extract a communication setting value corresponding to the communication cable that is connected, from the communication setting information, based on the gathered cable information; a first setting unit configured to set the extracted communication setting value, to a first storage device of a first communication switch to which the first connector is to be connected; and a first activation unit configured to activate a port of the first communication switch, the management apparatus includes: a second setting unit configured to set a communication setting value corresponding to communication cables provided in the second connector of the communication apparatus, to a relay apparatus to which the second connector is connected; and a second activation unit configured to activate a port of a second communication switch to which the relay apparatus is to be connected, and both in the control apparatus and in the management apparatus, the activation of the port of the first communication switch by the first activation unit is carried out in synchronization with the activation of the port of the second communication switch by the second activation unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Hereinafter, embodiments of a communication system, a control apparatus, and a management apparatus will be described with reference to the drawings. Note that the embodiments described below are merely exemplary, and it is not intended to limit various modifications and applications of the techniques. In other words, the present embodiments may be practiced in a wide variety of ways in the extent not departing from the spirits thereof. Furthermore, it is also not intended that only the depicted in the drawings are only included, but other functions and the like may be included.

(A) First Embodiment (a) Configuration

Figure 1:
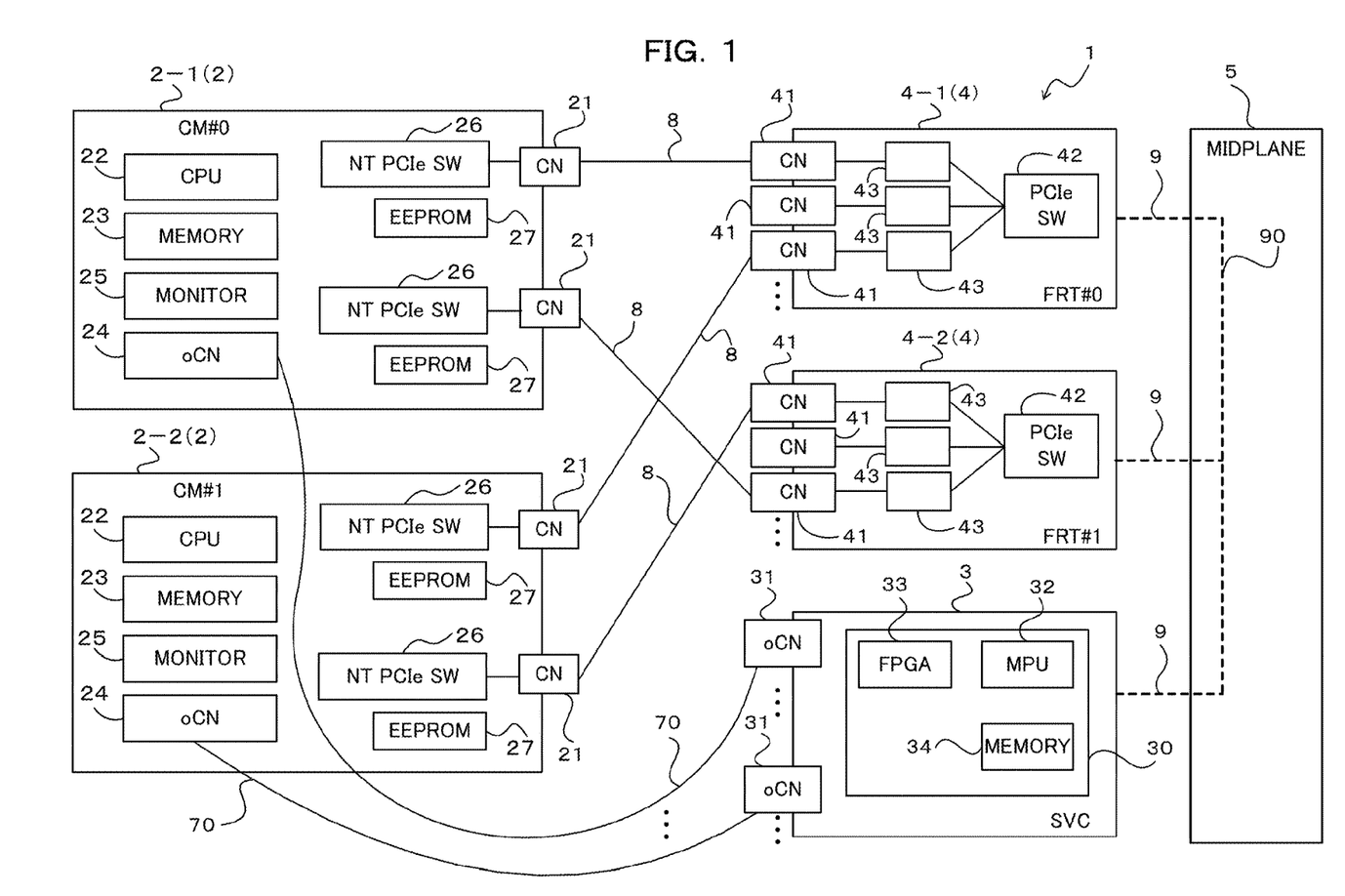
FIG. 1 is a diagram illustrating an example cable connection topology in a storage apparatus as one example of a first embodiment.

FIG. 1 is a diagram illustrating an example cable connection topology in a storage apparatus 1 as one example of a first embodiment.

In the example depicted in FIG. 1, the storage apparatus 1 includes a service controller (hereinafter, abbreviated as "SVC") 3, a midplane 5, multiple (two are illustrated in FIG. 1) controller modules (hereinafter, abbreviated as "CMs") 2-1, 2-2, and multiple (two are illustrated in FIG. 1) front-end routers (hereinafter, abbreviated as "FRTs") 4-1, 4-2.

In the storage apparatus 1 as described above, an example will be described wherein the multiple CMs 2-1, 2-2 and the multiple FRTs 4-1, 4-2 are connected through PCIe communication cables 8. A wide variety of cables, such as optical cables and copper (Cu) cables, for example, may be used for the communication cables 8. In the present embodiment, optical cables used as the communication cables 8 are described as active optical fibers (AOFs).

The midplane 5 is a circuit board apparatus that is adapted to carry out data communications among apparatuses, and includes multiple connectors (not illustrated) and carries out bus communications among apparatuses connected through those connectors.

In the example depicted in FIG. 1, the SVC 3 and the two FRTs 4-1, 4-2 are connected to the midplane 5.

The FRTs 4-1, 4-2 are communication apparatuses that realize communications between the CMs 2-1, 2-2 (inter-CM communications). The FRTs 4-1, 4-2 have similar configurations from each other.

Hereinafter, the FRT 4-1 may be referred to as FRT #0. Similarly, the FRT 4-2 may be referred to as FRT #1.

Hereinafter, as reference symbols for the FRTs, while reference symbols 4-1, 4-2 are used for referring to a particular one of the multiple FRTs, reference symbol 4 is used for referring to any of the FRTs.

Further, as reference symbols for the CMs, while reference symbols 2-1, 2-2 are used for referring to a particular one of the multiple CMs, reference symbol 2 is used for referring to any of the CMs.

[1] FRT

Each FRT 4 includes a PCIe switch (PCIe SW) 42, multiple (e.g., 24) connectors (first connector) 41, and multiple (e.g., 24) PCIe repeaters 43. For the sake of brevity, a part of the connectors 41 in the FRTs 4 are illustrated in FIG. 1.

To the connectors 41, connectors (not illustrated) attached to ends of PCIe communication cables (hereinafter, simply referred to as "communication cables") 8 are detachably provided. For example, when a connector of a communication cable 8 is a male connector, a corresponding connector 41 is a female connector.

Connector (not illustrated) attached to the other ends of the communication cables 8 are provided to the connectors 21 of the CMs 2-1, 2-2 that will be described later.

Hereinafter, the situation where a connector of a communication cable 8 is attached to a connector 41 or a connector 21 is referred to as being provided (mounted), and the situation where a connector of a communication cable 8 is not attached to a connector 41 or a connector 21 is referred to as being not-provided (unmounted).

Further, the situation where a connector of a communication cable 8 is physically inserted to a connector 41 of an FRT 4 or a connector 21 of a CM 2 is referred to as the provided state or mounted state. The situation where a connector of the communication cable 8 is inserted to a connector 41 of an FRT 4 or a connector 21 of a CM 2 and becomes electrically communicative is referred to as the connected state.

Each FRT 4 is connected to all of the CM 2 through the communication cables 8. In other words, each CM 2 is connected to all of the FRT 4 via the respective communication cables 8.

To connectors at the both ends of a communication cable 8, read only memories (ROMs) having the same information about the serial number (S/N) and the cable type, are provided. The FRTs 4 and the CMs 2 can read information about the serial numbers and the cable types from those ROMs, and know these information. Note that details of the information about the cable type will be described later.

Each FRT 4 includes a programmable logic device (PLD) that is not illustrated. The PLD checks whether or not a communication cable 8 is provided (mounted) to each connector 41, and stores, in a storage area (not illustrated) such as a register, information as to whether or not a communication cable 8 is provided (mounted) to each connector 41.

Hereinafter, the status as to whether or not a communication cable 8 is provided may be referred to as the mount state or provision state. The information indicating the mount state of a communication cable 8 to a connector 41 may be referred to as the mount state information or provision state information.

The PCIe switch 42 is a circuit device that switches among data communication paths, and causes data received in one connector 41 to be output to another connector 41, depending on the destination (communicating party) of the data.

The PCIe repeaters 43 are apparatuses for relaying data, and are provided between the connectors 41 and the PCIe switch 42, in the same number as the number of connectors 41.

Each PCI e repeater 43 includes a memory (not illustrated) that includes a waveform adjustment value (communication setting value) stored therein. Note that the waveform adjustment values will be described later.

Each FRT 4 is connected to the SVC 3 via a data bus 9 and the midplane 5. Hereinafter, the data communication path connecting each FRT 4 and the SVC 3 through the data bus 9 and the midplane 5 may be referred to as a first data bus 90.

[2] CM

Each CM 2 is adapted to carry out various controls in the storage apparatus 1, and carries out various controls, such as access controls to a storage device, e.g., a hard disk drive (HDD) that is not illustrated, according to storage access requests from a host apparatus (not illustrated). The CMs 2 have similar configurations from each other. The CMs 2 are enclosed in a controller enclosure (CE) that is not illustrated.

The CMs 2 realize a cable adjustment function (waveform adjustment function) for setting waveform adjustment values corresponding to the communication cables 8 connecting to the FRTs 4, in cooperation with the SVC 3 that will be described later.

The CMs 2 exemplified in FIG. 1 include CPUs 22, a memories 23, connectors 24, monitor devices 25, and also include multiple (four in the example depicted in FIG. 1)

connectors 21, NT (Non-Transparent) PCIe switches 26 and electrically erasable programmable (EEP) ROMs 27.

To the connectors 21, connectors at either ends of the communication cables 8 are detachably provided. For example, when a connector of a communication cable 8 is a male connector, a corresponding connector 21 is a female connector.

The connectors at the other ends of the communication cables 8 are provided to the connectors 41 of the FRTs 4 described above. Each CM 2 is connected to all of the FRT 4 through the communication cable 8.

Ends of monitor interface cables 70 are detachably provided to the connectors 24. The other ends of the monitor interface cables 70 are provided to the connectors 31 provided to the SVC 3 described later, and thereby the CMs 2 are communicatively connected to the SVC 3 via the monitor interface cables 70.

The connectors 21 are connected to the respective NT PCIe switches 26. The NT PCIe switches 26 are PCIe switches including a non-transparent bridge that disguises requests from multiple host apparatuses as those from a single host apparatus. Each NT PCIe switch 26 includes an EEPROM 27 that stores setting values for operating that NT PCIe switch 26. A waveform adjustment value (described later) is stored in the EEPROM 27.

To reflect a waveform adjustment value stored in an EEPROM 27 to operations of the NT PCIe switch 26, the port of the NT PCIe switch 26 is reset after storing (updating) the waveform adjustment value into the EEPROM 27.

Hereinafter, storing a waveform adjustment value into an EEPROM 27 may be referred to as reserving the waveform setting for a cable 8, or simply to reserving the waveform setting.

The monitor devices 25 are connected to the connectors 21 in the local CM 2 via data buses, for monitoring connected states of the communication cables 8 at the respective connectors 21 and reading information about the serial numbers and the cable types from the ROMs of the connected communication cables 8.

Each monitor device 25 includes a micro-processing unit (MPU) and a field programmable gate array (FPGA), which are not illustrated, for example, and obtains the mount states of communication cables 8 at the respective connectors 21 using the FPGA, and information about the serial numbers and the cable types of the communication cables 8 using the MPU, in the CM 2.

Note that the configuration of the monitor devices 25 is not limited to the above-described one, and may be practiced in a wide variety of ways. For example, the functions as the monitor devices 25 may be embodied by the CPUs 22 by executing a program.

The information about the serial numbers and the cable types obtained by the monitor devices 25 is stored in storage areas, such as registers (not illustrated).

Each monitor device 25 is also communicatively connected to the CPU 22 via a data bus.

Each memory 23 is a storage memory including an ROM and a random access memory (RAM). The ROM of the memory 23 has, stored therein, a software program for embodying a monitor function and a cable setting function (waveform adjustment function) of the CM 2, and data for that program. The software program on the memory 23 is read to and executed by the CPU 22 in an appropriate manner. The RAM of the memory 23 is used as a primary storage memory or a working memory.

The RAM of the memory 23 also includes tuning information (communication setting information) 231 stored therein.

Figure 2:
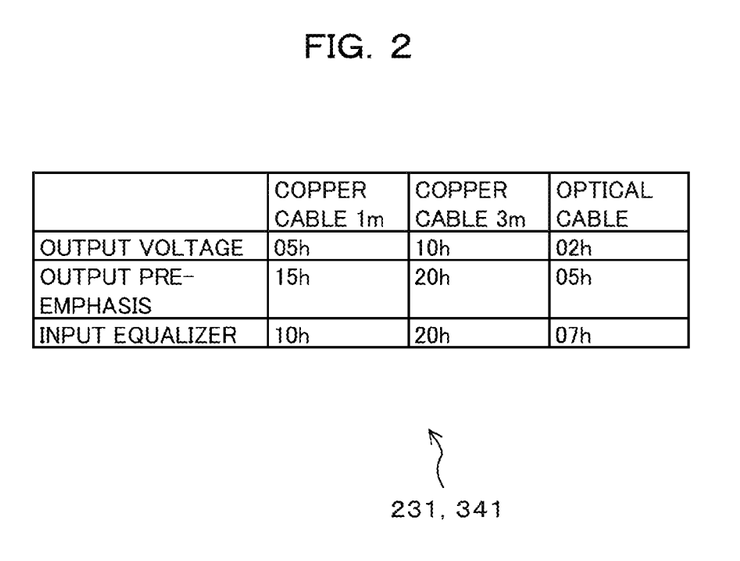
FIG. 2 is a diagram illustrating an example of tuning information in the storage apparatus as one example of the first embodiment.

FIG. 2 is a diagram illustrating an example of the tuning information 231 in the storage apparatus 1 as one example of the first embodiment.

The tuning information 231 includes respective waveform adjustment values (communication setting information) corresponding to the communication cables 8 in multiple types.

To make full use of the performances of the communication cable 8, waveform adjustment is to be carried out according to the cable types and cable lengths of the communication cables 8, for example. In the tuning information 231, predetermined optimal waveform adjustment values are associated with the communication cables 8 in multiple types, as communication setting information. Hereinafter, communication setting information may be referred to as waveform adjustment values.

The example depicted in FIG. 2 includes cable types of copper cables and optical cables, and further includes two cable lengths of one meter and three meters, for copper cables. In other words, the tuning information 231 depicted in FIG. 2 has three types for the communication cables 8: copper cables in one meter long, copper cables in three meters long, and optical cables. These cable types and cable lengths correspond to the information about the cable type of the communication cables 8.

Since there is no difference in values of communication setting information for optical cables having lengths of up to several meters, optical cables are not classified according to their lengths in the example depicted in FIG. 2.

Also in the example depicted in FIG. 2, information of output voltage, output pre-emphasis, and input equalizer is associated with the respective types of communication cables, as waveform adjustment values (communication control information).

By appropriately adjusting such values of output voltage, output pre-emphasis, and input equalizer, it is possible to achieve high-quality communications through the communication cables 8.

In the example depicted in FIG. 2, hexadecimal values each representing output voltage, output pre-emphasis, and input equalizer, are registered in tuning information 231. These values indicate the storage locations (e.g., addresses) in separate storage areas, such as registers (not illustrated), and the actual setting values (waveform adjustment values) of the output voltage, output pre-emphasis, and input equalizer, are registered in those storage areas.

The values (waveform adjustment values) registered in the tuning information 231 may be various types of information provided by manufacturers or the like of communication cables, or may be determined by carrying out tests in advance. The tuning information 231 may be saved upon factory shipment or may be adjusted on site.

Note that the tuning information 231 is not limited to the one depicted in FIG. 2, and may be practiced in a wide variety of ways. For example, the tuning information 231 may store information other than the output voltage, output pre-emphasis, and input equalizer described above, or a part of them may be eliminated. Alternatively, waveform adjustment values are directly stored in the tuning information 231, rather than the above-described storage locations of separate storage areas.

The CPU 22 is a processing device that carries out various controls and calculations, and embodies various functions by executing an operating system (OS) and programs stored in the memory 23.

Figure 3:
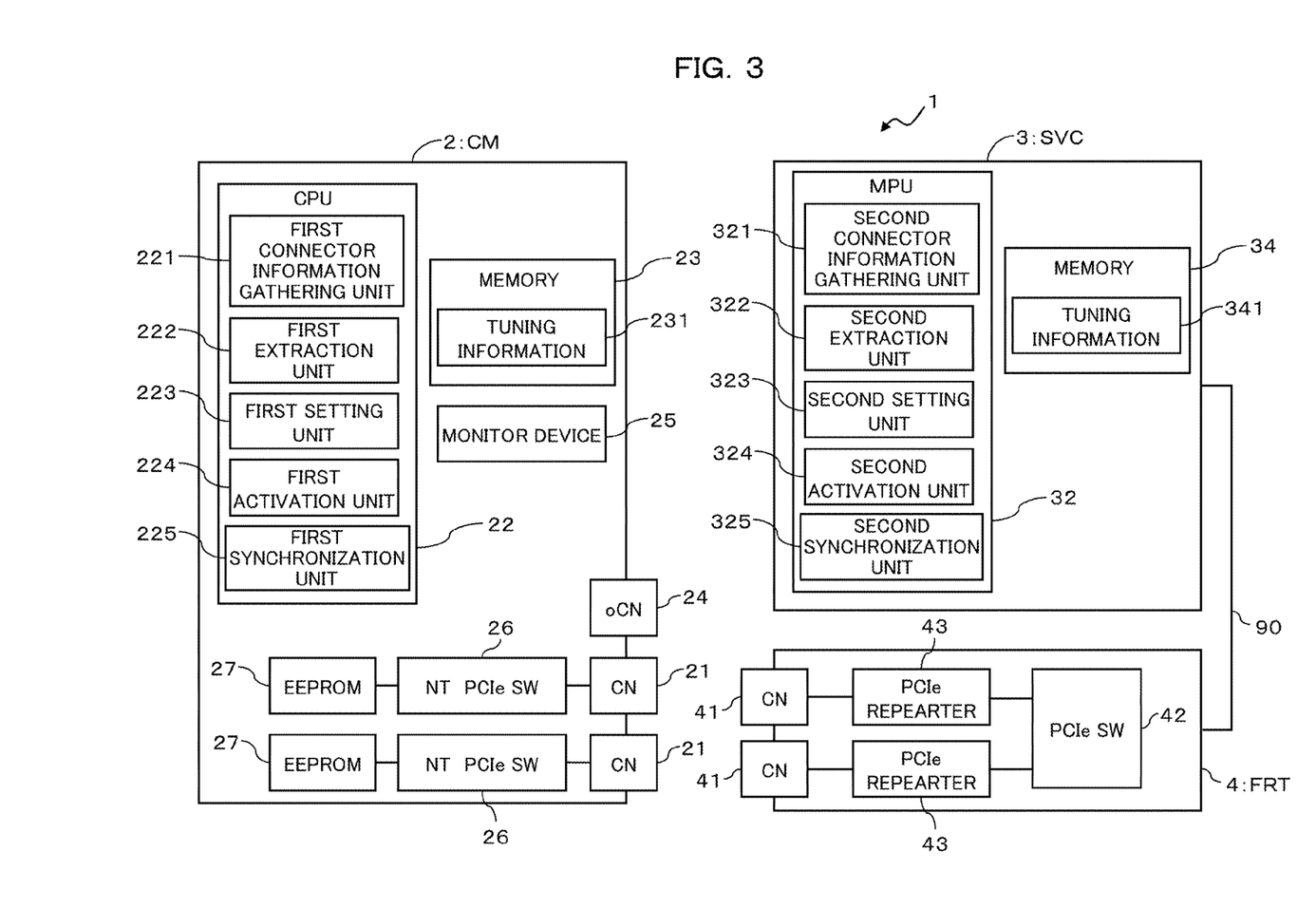
FIG. 3 is a drawing illustrating functional configurations of a CM and an SVC in the storage apparatus as one example of the first embodiment.

FIG. 3 is a drawing illustrating functional configurations of a CM 2 and the SVC 3 in the storage apparatus 1 as one example of the first embodiment.

As depicted in FIG. 3, the CPU 22 includes functions as a first connector information gathering unit 221, a first extraction unit 222, a first setting unit 223, a first activation unit 224, and a first synchronization unit 225.

The CPU 22 functions as the first connector information gathering unit 221, the first extraction unit 222, the first setting unit 223, the first activation unit 224, and the first synchronization unit 225, by executing a program stored in the memory 23 and the like.

The first connector information gathering unit 221 obtains information about the communication cables 8 provided to the connectors 21 provided at the local CM 2. In other words, the connector confirmation unit 222 collects, for each connector 21, the information about the serial number and the cable type of the communication cable 8 that is mounted.

For example, the first connector information gathering unit 221 reads the information about the serial numbers and the cable types obtained by the monitor devices 25 and stores them in registers or the like. Note that the first connector information gathering unit 221 (CPU 22) may gather the information about the serial numbers and the cable types from the connectors 21, for example, and the collection of the information may be appropriately modified.

The information about the serial numbers and the cable types gathered by the first connector information gathering unit 221 may be associated with information for identifying the connectors 21, and then may be stored in certain areas in the memory 23.

In the manner as described above, the first connector information gathering unit 221 functions as a first gathering unit configured to gather information (first identifier) about the cable type of the communication cables 8 provided to the connectors 21, for the respective connectors 21 provided at the CM 2.

The first extraction unit 222 extracts the waveform adjustment value (communication setting information) corresponding to the communication cable 8 that is connected, from the above-described tuning information 231, based on the information about the cable type of the communication cable 8 obtained by the first connector information gathering unit 221.

The first extraction unit 222 looks up the tuning information 231 based on the cable type and the cable length of the communication cable 8 that is mounted, and extracts a waveform adjustment value corresponding to the cable type and the cable length.

The first setting unit 223 stores the wave form adjustment value extracted by the first extraction unit 222, in the EEPROM 27 in the NT PCIe switch 26 corresponding to the connector 21 to which the communication cable 8 is mounted. The first setting unit 223 also causes the NT PCIe switch 26 to be restarted (reset), in order to reflect the waveform adjustment value stored in the EEPROM 27 to the NT PCIe switch 26. The reset of the NT PCIe switch 26 may be done by issuing an instruction command instructing a reset to the NT PCIe switch 26, for example, or may be practiced in a wide variety of ways by sending a certain signal to a reset terminal (not illustrated) provided at the NT PCIe switch 26.

Note that the situation where the first setting unit 223 causes the NT PCIe switch 26 having the EEPROM 27 storing waveform adjustment value to be restarted and the waveform adjustment value is reflected in the NT PCIe switch 26 may be referred to as completion of the waveform tuning.

The first activation unit 224 activates a port of the NT PCIe switch 26, an EEPROM 27 of which includes a waveform adjustment value set by the first setting unit 223, and to which this waveform adjustment value has been reflected.

For example, upon receiving a port activation instruction together with information for identifying a port of the NT PCIe switch 26, from the first synchronization unit 225, the first activation unit 224 activates that port.

Note that an activation of a particular port of the NT PCIe switch 26 can be carried out using well-known techniques, and descriptions thereof are omitted.

The first synchronization unit (first synchronization request notification unit, first synchronization unit) 225 causes an activation of a port of the NT PCIe switch 26 by the first activation unit 224 in synchronization with an activation of a port of the corresponding PCIe switch 42 by a second activation unit 324 in the SVC 3, which will be described later.

For example, when the first synchronization unit 225 confirms that a waveform tuning is completed by the first setting unit 223, the first synchronization unit 225 issues a port activation instruction (first synchronization request notification) together with information for identifying a port to be activated, both to the first activation unit 224 and to the SVC 3.

For example, the first synchronization unit 225 instructs the FPGA to send a port activation instruction. As a result, the FPGA sends a port activation instruction to the SVC 3 via the monitor interface cable 70.

Note that the notification of a port activation instruction from the CM 2 to the SVC 3 is not limited to the above-described one. For example, when the SVC 3 and the CMs 2 are connected via Ethernet®, the first synchronization unit 225 (CPU 22) may notify the SVC 3 of a port activation instruction via Ethernet, by passing the FPGA.

[3] SVC

The SVC 3 is a monitor apparatus that monitors various information in the present storage apparatus 1, and the SVC 3 communicates with the CMs 2 to collect error state information and accumulates it in an error log.

The SVC 3 also functions as a management apparatus that manages communications among the CMs 2 and the FRTs 4, and sets waveform adjustment values to the respective PCIe repeaters 43 in the FRTs 4 in cooperation with the CMs 2, as will be described later.

The SVC 3 includes a monitor device 30 and multiple (two are illustrated in the example depicted in FIG. 1) connectors (oCN) 31, as depicted in FIG. 1. To the connector 31, connectors (not illustrated) at either ends of the monitor interface cables 70 are detachably provided. Connectors (not illustrated) at the other ends of the monitor interface cables 70 are provided to the connectors (oCN) 24 provided at the CMs 2, such that the SVC 3 are communicatively connected to the respective CMs 2 via the monitor interface cables 70, for monitoring the CMs 2.

While the two CM 2 and the two connector 31 are illustrated in the example depicted in FIG. 1 for the sake of brevity, three or more (e.g., 24) of CMs 2 and connectors 31 may be provided and may be practiced in a wide variety of ways.

The monitor device 30 includes an MPU 32, an FPGA 33, and a memory 34.

The FPGA 33 is an integrated circuit having a writable circuit configuration, and connectors 31 provided at the FPGA 33 are connected to the respective multiple (e.g., 24) ports.

The memory 34 is a storage memory including a ROM and a RAM. The ROM in the memory 34 has, stored therein, a software program (farmware) for embodying the monitor function and the cable adjustment function (waveform adjustment function) of the SVC 3, and data for that program. The software program on the memory 34 is read to and executed by the MPU 32 in an appropriate manner. The RAM in the memory 34 is used as a primary storage memory or a working memory.

The RAM in the memory 34 also includes tuning information (communication setting information) 341 stored therein.

The tuning information 341 includes respective waveform adjustment values (communication setting information) corresponding to the communication cables 8 in multiple types. The tuning information 341 has a configuration similar to that of the above-described tuning information 231, and detailed descriptions thereof are omitted.

Similar to the tuning information 231, values (waveform adjustment values) registered in the tuning information 341 may also be various types of information provided by manufacturers or the like of communication cables, or may be determined by carrying out tests in advance. The tuning information 341 may be saved upon factory shipment or may be adjusted on site.

The MPU 32 is a processing device that carries out various controls and calculations, and embodies various functions by executing an OS and programs stored in the memory 34.

As depicted in FIG. 3, the MPU 32 includes functions as a second connector information gathering unit 321, a second extraction unit 322, a second setting unit 323, a second activation unit 324, and a second synchronization unit 325.

The MPU 32 functions as the second connector information gathering unit 321, the second extraction unit 322, the second setting unit 323, the second activation unit 324, and the second synchronization unit 325, by executing a program stored in the memory 34 and the like.

The second connector information gathering unit 321 obtains information about the communication cables 8 provided to the connectors 41 provided at the FRT 4. In other words, the second connector information gathering unit 321 collects the information about the serial number and the cable type of the communication cable 8 that is mounted, for each connector 41.

The second connector information gathering unit 321 obtains, for each connector 41 in the respective FRTs 4, information about a connection with a communication cable 8 at that connector 41. Specifically, the second connector information gathering unit 321 collects, for each connector 41 in the respective FRTs 4, information as of provided or not-provided, and information about the serial number (S/N) and the cable type, from that FRT 4 via the first data bus 90.

The information as of provided or not-provided indicates whether or not a communication cable 8 is provided at the connector 41. Specifically, the information as of provided or not-provided is information indicating either "mounted" or "unmounted".

For example, when a connector of a communication cable 8 is attached to a connector 41 of an FRT 4, a signal indicating the mounted state is sent to the FPGA 33 in the monitor device 30 in the SVC 3 and a flag is set in the corresponding register.

When the present storage apparatus 1 is started or when operations of the storage apparatus 1 is initiated, a PLD (not illustrated) provided at the monitor device 30 reads values of flags in the FPGA 33 to obtain a mount state of each connector 41 in the respective FRTs 4. The connector confirmation unit 322 obtains the mount state information by reading the mount states gathered by the PLD.

The second connector information gathering unit 321 reads, from each connector 41 of the respective FRT 4, information about the serial number and the cable type of the communication cable 8 provided to that connector 41, via the first data bus 90.

Note that the method of gathering information about the serial number and the cable type in the FRTs 4 may be appropriately modified. For example, a PLD provided at each FRT 4 may gather information about the serial numbers and the cable types and store it in a storage area, such as a register (not illustrated), and the second connector information gathering unit 321 may gather the information about the serial numbers and the cable types by reading the information stored in that storage area.

The information about the cable types and the like gathered by the second connector information gathering unit 321 may be associated with information for identifying the connectors 41 to which the communication cables 8 are mounted, and may be stored in certain areas in the memory 34.

In the manner as described above, the second connector information gathering unit 321 functions as a second gathering unit configured to gather, for each connector 41 in the respective FRTs 4, information (second identifier) about the cable type of a communication cable 8 provided to that connectors 41.

The second extraction unit 322 extracts the waveform adjustment value (communication setting information) corresponding to the communication cable 8 that is connected, from the above-described tuning information 341, based on the information about the cable type of the communication cable 8, obtained by the second connector information gathering unit 321.

The second extraction unit 322 looks up the tuning information 341 based on the cable type and the cable length of the communication cable 8 that is mounted, and extracts a waveform adjustment value corresponding to the cable type and the cable length.

The second setting unit 323 sets the waveform adjustment value extracted by the second extraction unit 322, to the PCIe repeater 43 corresponding to the connector 41 to which that communication cable 8 is mounted. Note that the technique to set the waveform adjustment value to the PCIe repeater 43 is well-known, and descriptions thereof are omitted.

The second activation unit 324 activates apart connected to the PCIe repeater 43 to which the waveform adjustment value is set by the second setting unit 323, in the PCIe switch 42.

For example, upon receiving a port activation instruction together with information for identifying a port of the PCIe switch 42, from the second synchronization unit 325, the second activation unit 324 activates that port.

Note that an activation of a particular port of the PCIe switch 42 can be carried out using well-known techniques, and descriptions thereof are omitted.

The second synchronization unit 325 causes an activation of a port of the NT PCIe switch 26 by the first activation unit 224 in synchronization with an activation of a port of the PCIe switch 42 by the second activation unit 324 in the SVC 3.

For example, at a time when the second activation unit 324 carries out Activation of the PCIe switch 42, the second synchronization unit (second synchronization request notification unit, second synchronization unit) 325 issues a port activation instruction (second synchronization request notification) together with information for identifying a port to be activated, to the CM 2.

(b) Operations

Figure 4:
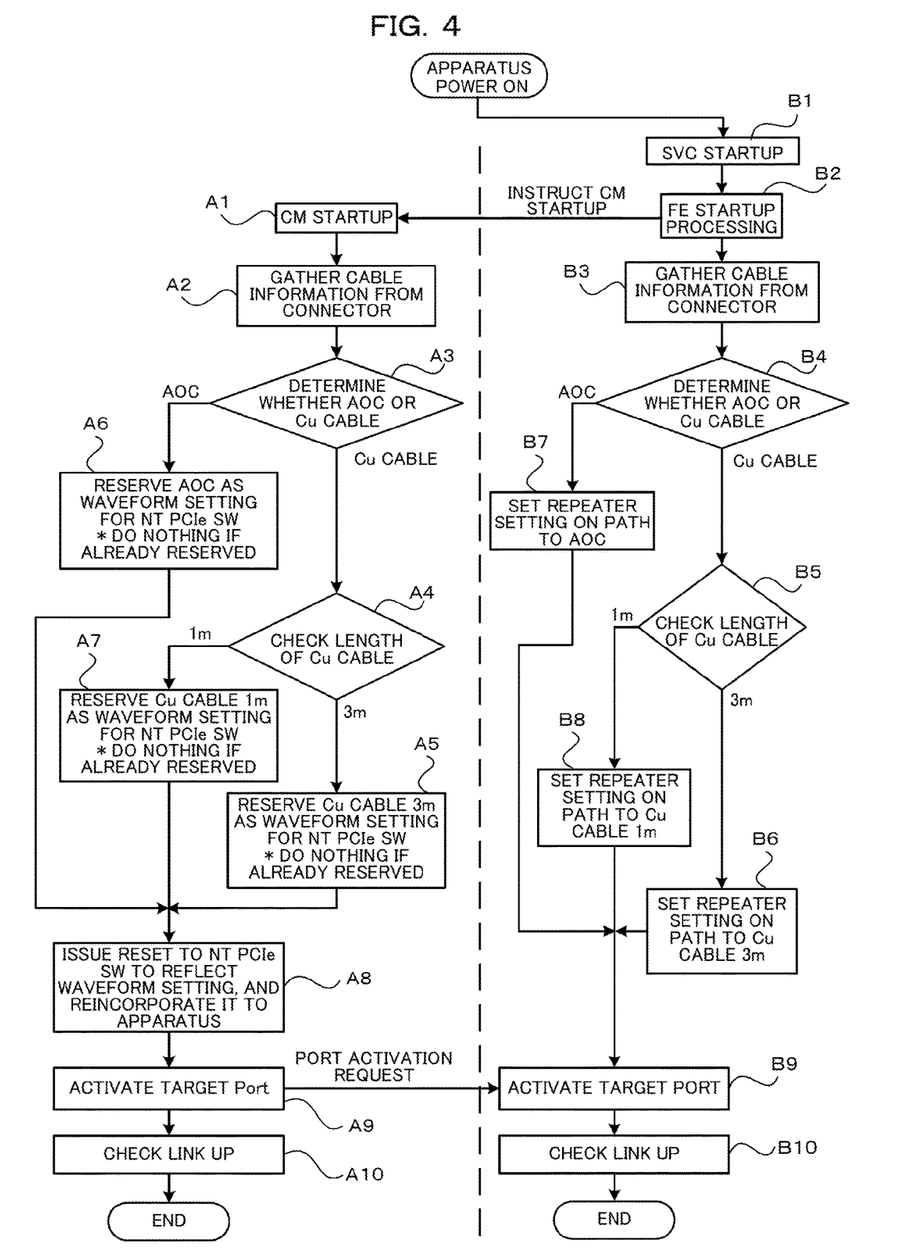
FIG. 4 is a flowchart illustrating processing upon startup of the apparatus in the storage apparatus as one example of the first embodiment.

Processing in the storage apparatus 1 as one example of the first embodiment configured as described above, upon startup of the apparatus, will be described with reference to the flowchart (Steps A1 through A10 and B1 through B10) depicted in FIG. 4. In the flowchart depicted in FIG. 4, Steps A1 through A10 indicate processing by the CMs 2, whereas Steps B1 through B10 indicate processing by the SVC 3. The processing uses the tuning information 231, 341 depicted in FIG. 2.

When the present storage apparatus 1 is powered up, power is also supplied to the SVC 3 and the SVC 3 is started (Step B1).

In the SVC 3, startup processing of a front end enclosure (FE) is executed (Step B2). The FE is a connection apparatus for connecting the multiple CMs 2, and is configured to contain the SVC 3 and the FRTs 4 into a single enclosure. By the FE startup processing, a startup instruction is issued to the CMs 2. As a result, the CMs 2 are started (Step A1).

In the SVCS 3, the second connector information gathering unit 321 checks whether or not a communication cable 8 is provided to any of the connectors 41 provided at each FRT 4, and obtains information about the serial numbers and the cable types of the communication cables 8 (Step B3). The second extraction unit 322 checks whether the cable type is an AOC or a Cu cable, based on the information obtained by the second connector information gathering unit 321 (Step B4).

When the cable type of a communication cable 8 is a Cu cable (refer to the "Cu cable" route from Step B4), the second connector information gathering unit 321 then checks the length of the Cu cable (Step B5).

When the check reveals that the communication cable 8 has a cable length of three meters (refer to the "3 m" route from Step B5), the second extraction unit 322 extracts a waveform adjustment value corresponding to 3 m-long Cu cables, from the tuning information 341. The second setting unit 323 then sets the extracted waveform adjustment value, to the PCIe repeater 43 corresponding to the connector 41 to which the communication cable 8 is connected (Step B6).

Otherwise, when the check reveals that the communication cable 8 has a cable length of one meter (refer to the "1 m" route from Step B5), the second extraction unit 322 extracts a waveform adjustment value corresponding to 1 m-long Cu cables, from the tuning information 341. The second setting unit 323 then stores the extracted waveform adjustment value, to the PCIe repeater 43 corresponding to the connector 41 to which the communication cable 8 is connected (Step B8).

When the cable type of the communication cable 8 is an AOC (refer to the "AOC" route from Step B4), the second extraction unit 322 extracts a waveform adjustment value corresponding to optical cables, from the tuning information 341. The second setting unit 323 then stores the extracted waveform adjustment value, to the PCIe repeater 43 corresponding to the connector 41 to which the communication cable 8 is connected (Step B7).

On the other hand, in each CM 2, the first connector information gathering unit 221 checks whether or not a communication cable 8 is provided to any of the connectors 21 provided at the local CM 2, and obtains information about the serial number and the cable type of each communication cable 8 (Step A2). The first extraction unit 222 checks whether the cable type is an AOC or a Cu cable, based on the information obtained by the first connector information gathering unit 221 (Step A3).

When the cable type of a communication cable 8 is a Cu cable (refer to the "Cu cable" route from Step A3), the first extraction unit 222 then checks the length of the Cu cable (Step A4).

When the check reveals that the communication cable 8 has a cable length of three meters (refer to the "3 m" route from Step A4), the first extraction unit 222 extracts a waveform adjustment value corresponding to 3 m-long Cu cables, from the tuning information 231. The first setting unit 223 then stores the extracted waveform adjustment value, to the EEPROM 27 of the NT PCIe switch 26 corresponding to the connector 21 to which that communication cable 8 is connected. In other words, the first setting unit 223 reserves the extracted waveform setting for the communication cable 8 (Step A5). Note that nothing is done if a waveform setting has already been reserved for the communication cable 8.

Otherwise, when the check reveal s that the communication cable 8 has a cable length of one meter (refer to the "1 m" route from Step A4), the first extraction unit 222 extracts a waveform adjustment value corresponding to 1 m-long Cu cables, from the tuning information 231. The first setting unit 223 then stores the extracted waveform adjustment value, to the EEPROM 27 of the NT PCIe switch 26 corresponding to the connector 21 to which that communication cable 8 is connected. In other words, the first setting unit 223 reserves the extracted waveform setting for the communication cable 8 (Step A7). Note that nothing is done if a waveform setting has already been reserved for the communication cable 8.

Otherwise, when the cable type of the communication cable 8 is an AOC (refer to the "AOC" route from Step A3), the first extraction unit 222 extracts a waveform adjustment value corresponding to optical cables, from the tuning information 231. The first setting unit 223 then stores the extracted waveform adjustment value, to the EEPROM 27 of the NT PCIe switch 26 corresponding to the connector 21 to which that communication cable 8 is connected. In other words, the first setting unit 223 reserves the extracted waveform setting for the communication cable 8 (Step A6). Note that nothing is done if a waveform setting has already been reserved for the communication cable 8.

Thereafter, the first setting unit 223 issues a reset to the NT PCIe switch 26, to reflect the communication setting information stored in the EEPROM 27 to the NT PCIe switch 26 (Step A8).

The first synchronization unit 225 issues a port activation instruction together with information for identifying a port to be activated, to the first activation unit 224 (Step A9). Upon receiving the port activation instruction, the first activation unit 224 activates a port of the NT PCIe switch 26 to which the communication setting information is set by the first setting unit 223.

The first synchronization unit 225 also notifies a port activation instruction of the SVC 3. In the SVC 3, upon receiving the port activation instruction, the second synchronization unit 325 issues a port activation instruction together with information for identifying a port to be activated, to the second activation unit 324 (Step B9).

The second activation unit 324 activates apart connected to the PCIe repeater 43 to which the communication setting information is set by the second setting unit 323, in the FRT 4.

As a result, the port of the NT PCIe switch 26 and the port of the PCIe switch 42 in the FRT 4 are activated, synchronizing the CM 2 and the FRT 4.

Thereafter, the CMs 2 and the SVC 3 confirm link-up (Steps A10, B10), and terminate the respective processing.

(c) Advantageous Effects

As described above, in accordance with the storage apparatus 1 as one example of the first embodiment, waveform adjustment values corresponding to the communication cables 8 used in connections are extracted from the tuning information 231 and the tuning information 341, and are set to the NT PCIe switches 26 and the PCIe repeaters 43.

In other words, in the CMs 2, the first connector information gathering unit 221 reads information about the cable types that is read from the ROMs of the communication cables 8. The first extraction unit 222 then reads waveform adjustment values corresponding to the cable types from the tuning information 231, and the first setting unit 223 sets the values to the NT PCIe switches 26.

On the other hand, in the SVC 3, the second connector information gathering unit 321 reads information about the cable types that is read from the ROMs of the communication cables 8. The second extraction unit 322 then reads waveform adjustment values corresponding to the cable types from the tuning information 341, and the second setting unit 323 sets the values to the PCIe repeaters 43.

As a result, optimal waveform setting values according to communication cables 8 that are employed, are autonomously set to the NT PCIe switches 26 and the PCIe repeaters 43, and hence it becomes possible to carry out communications through the communication cables 8 with stable signal qualities.

Furthermore, in the FRTs 4, the SVC 3 sets the waveform setting values to the PCIe repeaters 43. As a result, the changes in the waveform setting values can be reflected in the FRT 4, without restarting the FRTs 4. Therefore, the apparatuses can be operated in a stable manner without affecting the CMs 2 connected to the FRTs 4.

(B) Second Embodiment

While the second extraction unit 322 extracts waveform setting values according to the communication cables 8 from the tuning information 341 in the SVC 3 in the first embodiment described above, this is not limiting.

Figure 5:
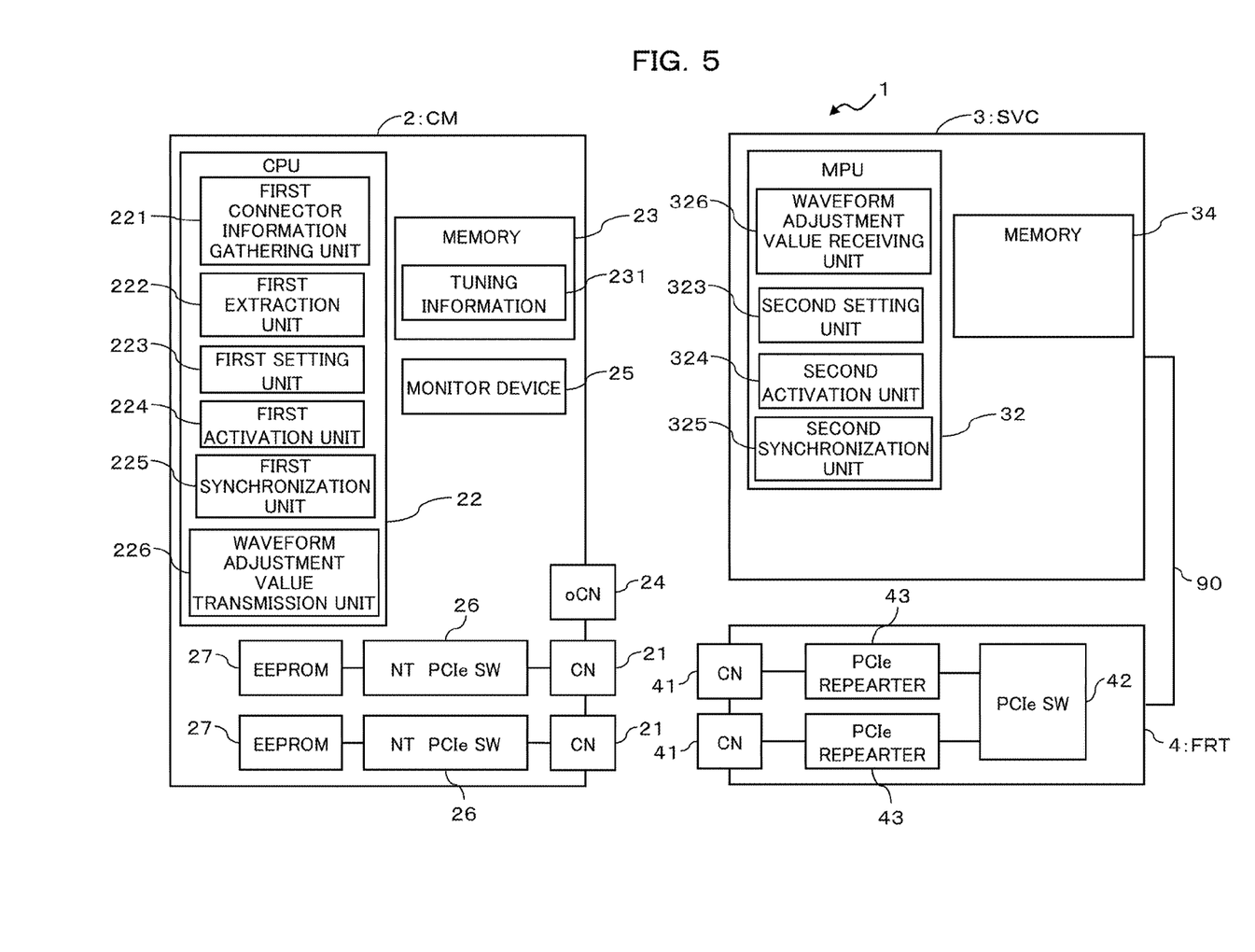
FIG. 5 is a drawing illustrating functional configurations of a CM and an SVC in a storage apparatus as one example of a second embodiment.

FIG. 5 is a drawing illustrating functional configurations of a CM 2 and an SVC 3 as one example of a second embodiment in the storage apparatus 1.

As depicted in FIG. 5, in this second embodiment, in the CMs 2, a CPU 22 further includes a function as a waveform adjustment value transmission unit 226. The other elements of the CMs 2 are configured in the similar manner as those in the first embodiment.

Further, the SVC 3 includes a waveform adjustment value receiving unit 326, in place of the second connector information gathering unit 321 and the second extraction unit 322. The other elements of the SVC 3 are configured in the similar manner as those in the first embodiment.

In each CM2, the waveform adjustment value transmission unit 226 sends the SVC 3, the waveform setting value extracted from the tuning information 231 by the first extraction unit 222, together with information for identifying a port of the NT PCIe switch 26 (connector 21) to which a communication cable 8 is connected.

In the SVC 3, the waveform adjustment value receiving unit 326 receives the waveform adjustment value sent from the waveform adjustment value transmission unit 226 in a CM 2, and notifies the second setting unit 323 of the received waveform adjustment value. The second setting unit 323 sets the waveform adjustment value receive by the wave form adjustment value receiving unit 326 to the PCIe repeater 43. At this time, the second setting unit 323 identifies the PCIe repeater 43 to which the waveform adjustment value is to be set, based on the information for identifying the NT PCIe switch 26 (connector 21) received from the waveform adjustment value transmission unit 226, together with the waveform adjustment value.

As described above, in accordance with the storage apparatus 1 as one example of the second embodiment, it is possible to eliminate the function as the second connector information gathering unit 321 and the second extraction unit 322 in the SVC 3, thereby reducing the load on the MPU 32. Further, since no tuning information 341 is stored in the memory 34, it is possible use the memory 34 effectively.

(C) Miscellaneous

The program for embodying the functions as the second connector information gathering unit 321, the second extraction unit 322, the second setting unit 323, the second activation unit 324, the second synchronization unit 325, and the waveform adjustment value receiving unit 326 in the SVC 3 in the storage apparatus 1 in accordance with the first embodiment and the second embodiment described above, is provided while being stored in a computer-readable storage medium, such as flexible disks, CDs (CD-ROM, CD-R, CD-RW, and the like), DVDs (DVD-ROM, DVD-RAM, DVD-R, DVD+R, DVD-RW, DVD+RW, HD DVD, and the like), Blu-ray disks, magnetic disks, optical disks, magneto-optical disks, for example. A computer reads the program from that storage medium, and transfers and stores it in an internal storage device or an external storage device, to use the program. Alternatively, the program may be recorded in a storage device (storage medium), such as magnetic disks, optical disks, magneto-optical disks, for example, and may be provided from the storage device to the computer, through a communication path.

Upon embodying the functions as the second connector information gathering unit 321, the second extraction unit 322, the second setting unit 323, the second activation unit 324, the second synchronization unit 325, and the waveform adjustment value receiving unit 326, a program stored an internal storage device (the RAM or the ROM in the memory 34 in the present embodiments) is executed by a microprocessor in a computer (the MPU 32 in the present embodiments). At this time, the program recorded in a storage medium may be read and executed by the computer.

Further, the program for embodying the functions as the first connector information gathering unit 221, the first extraction unit 222, the first setting unit 223, the first activation unit 224, the first synchronization unit 225, and the waveform adjustment value transmission unit 226 in the CMs 2 in the storage apparatus 1 in accordance with the first embodiment and the second embodiment described above, is provided while being stored in a computer-readable storage medium, such as flexible disks, CDs (CD-ROM, CD-R, CD-RW, and the like), DVDs (DVD-ROM, DVD-RAM, DVD-R, DVD+R, DVD-RW, DVD+RW, HD DVD, and the like), Blu-ray disks, magnetic disks, optical disks, magneto-optical disks, for example. A computer reads the program from that storage medium, and transfers and stores it in an internal storage device or an external storage device, to use the program. Alternatively, the program may be recorded in a storage device (storage medium), such as magnetic disks, optical disks, magneto-optical disks, for example, and may be provided from the storage device to the computer, through a communication path.

Upon embodying the functions as the first connector information gathering unit 221, the first extraction unit 222, the first setting unit 223, the first activation unit 224, the first synchronization unit 225, and the waveform adjustment value transmission unit 226, a program stored an internal storage device (the RAM or the ROM in each memory 23 in the present embodiments) is executed by a microprocessor in a computer (each CPU 22 in the present embodiments). At this time, the program recorded in a storage medium may be read and executed by the computer.

The disclosed technique is limited to the above-described embodiments and may be practiced in a wide variety of ways in the extent not departing from the spirit of the present embodiment. The configurations and processing of the present embodiments may be omitted or selected where necessary, or may be appropriately combined.

For example, the number of CMs 2 and the number of FRTs 4 provided in the present storage apparatus 1 are not limited to those in the above-described embodiments, and may be practiced in a wide variety of ways.

Similarly, the number of connectors 21 provided at each CM 2 and the number of connectors 41 provided at each FRT 4 are also not limited to those in the above-described embodiments, and may be practiced in a wide variety of ways.

Further, while the communication cables 8 are PCIe cables and communications are carried out among the CMs 2 and the FRTs 4 in accordance with PCIe in the above-described embodiments, this is not limiting and the embodiments may be applied to communications compliant with various standards other than PCIe.

Further, while examples of the communication cable 8 connecting the CMs 2 and the FRTs 4 in the storage apparatus 1 are presented in the above-described embodiments, this is not limiting. For example, the embodiments may be applied to a computer system connecting multiple information processing devices, and may be practiced in a wide variety of ways.

While the CMs 2 include a function as the waveform adjustment value transmission unit 226 and waveform adjustment value are sent from the CMs 2 to the SVC 3 and the SVC 3 uses the received waveform adjustment values in the above-described second embodiment, this is not limiting.

In other words, the SVC 3 may include a function as the waveform adjustment value transmission unit 226, the SVC 3 may send waveform adjustment values to the CMs 2, and the CMs 2 may use the received waveform adjustment values.

Specifically, similarly to the first embodiment, the MPU 32 in the SVC 3 includes a function as the waveform adjustment value transmission unit 226, as well as functions as the second connector information gathering unit 321 and the second extraction unit 322. Further, the CMs 2 include functions as the waveform adjustment value receiving unit 326. In this configuration, it is possible to reduce the loads on the CMs 2.

Further, while the MPU 32 in the SVC 3 embodies functions as the second connector information gathering unit 321, the second extraction unit 322, the second setting unit 323, the second activation unit 324, the second synchronization unit 325, and the waveform adjustment value receiving unit 326 in the above-described embodiments, this is not limiting. A processing device different from the SVC 3 may be provided, and this processing device may embody functions as the second connector information gathering unit 321, the second extraction unit 322, the second setting unit 323, the second activation unit 324, the second synchronization unit 325, and the waveform adjustment value receiving unit 326 in the SVC 3.

Similarly, in the above-described embodiments, functions as the first connector information gathering unit 221, the first extraction unit 222, the first setting unit 223, the first activation unit 224, the first synchronization unit 225, and the waveform adjustment value transmission unit 226 embodied by the CPUs 22 in the CMs 2 may be embodied by processing devices configured separately from the CMs 2 to embody functions as the first connector information gathering unit 221, the first extraction unit 222, the first setting unit 223, the first activation unit 224, the first synchronization unit 225, and the waveform adjustment value transmission unit 226.

In such processing devices, a processor may embody the above-described functions by executing software, or at least a part of the functions may be embodied by a circuit device.

The disclosure set forth above enables those skilled in the art to practice and manufacture the present embodiments.

In accordance with one embodiment, the flexibility of configurations employing communication cables can be improved.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:
1. A communication system comprising:
   a control apparatus comprising a first connector;
   a communication apparatus that comprises a second connector and is connected to the control apparatus through communication cables; and
   a management apparatus configured to control communications between the control apparatus and the communication apparatus,
   wherein the control apparatus comprises:
      a first storage unit configured to store communication setting information about a plurality of types of communication cables;
      a first gathering unit configured to gather cable information about the communication cables connected to the first connector of the control apparatus;
      a first extraction unit configured to extract a communication setting value corresponding to the communication cable that is connected, from the communication setting information, based on the gathered cable information;
      a first setting unit configured to set the extracted communication setting value, to a first storage device of a first communication switch to which the first connector is to be connected; and a first activation unit configured to activate a port of the first communication switch, the management apparatus comprises:
- a second setting unit configured to set a communication setting value corresponding to communication cables provided in the second connector of the communication apparatus, to a relay apparatus to which the second connector is connected; and
- a second activation unit configured to activate a port of a second communication switch to which the relay apparatus is to be connected, and
- the activation of the port of the first communication switch by the first activation unit of the control apparatus is carried out in synchronization with the activation of the port of the second communication switch by the second activation unit of the management apparatus.

2. The communication system according to claim 1, wherein the management apparatus comprises:
- a second storage unit configured to store communication setting information about the plurality of types of communication cables; and
- a second gathering unit configured to gather cable information about the communication cables connected to the second connector of the communication apparatus; and
- a second extraction unit configured to extract a communication setting value corresponding to the communication cable that is connected, from the communication setting information, based on the gathered cable information, and the second setting unit is configured to set the communication setting value extracted by the second extraction unit, to the relay apparatus.

3. The communication system according to claim 1, wherein
- the control apparatus comprises a transmission unit configured to send to the communication apparatus, the communication setting value extracted by the first extraction unit, and
- in the management apparatus, the second setting unit is configured to set the communication setting value sent from the transmission unit, to the relay apparatus.

4. The communication system according to claim 1, wherein
- the control apparatus comprises a first synchronization request notification unit configured to send a first synchronization request notification to the management apparatus, at a time when the first activation unit carries out the activation of the port of the first communication switch, and
- in the management apparatus, the second activation unit is configured to activate the port of the second communication switch upon receiving the first synchronization request notification.

5. The communication system according to claim 1, wherein
- the management apparatus comprises a second synchronization request notification unit configured to send a second synchronization request notification to the control apparatus, at a time when the second activation unit carries out the activation of the port of the second communication switch, and
- in the control apparatus, the first activation unit is configured to activate the port of the first communication switch upon receiving the second synchronization request notification.

6. A control apparatus that is connected to a communication apparatus comprising a second connector through communication cables, and is communicatively connected to a management apparatus, the control apparatus comprising:
- a first connector;
- a first storage unit configured to store communication setting information about a plurality of types of communication cables;
- a first gathering unit configured to gather cable information about the communication cables connected to the first connector;
- a first extraction unit configured to extract a communication setting value corresponding to the communication cable that is connected, from the communication setting information, based on the gathered cable information;
- a first setting unit configured to set the extracted communication setting value, to a first storage device of a first communication switch to which the first connector is to be connected;
- a first activation unit configured to activate a port of the first communication switch; and
- a first synchronization unit configured to cause the management apparatus to carry out an activation of a port of a second communication switch provided at the communication apparatus, in synchronization with the activation of the port of the first communication switch by the first activation unit.

7. The control apparatus according to claim 6, further comprising:
- a transmission unit configured to send to the communication apparatus, the communication setting value extracted by the first extraction unit.

8. The control apparatus according to claim 6, wherein
the first synchronization unit comprises a first synchronization request notification unit configured to send a first synchronization request notification to the management apparatus, at a time when the first activation unit carries out the activation of the port of the first communication switch.

9. A management apparatus that is communicatively connected both to a control apparatus comprising a first connector and to a communication apparatus that comprises a second connector and is connected to the control apparatus through communication cables, the management apparatus being configured to control communications between the control apparatus and the communication apparatus, the management apparatus comprising:
- a second storage unit configured to store communication setting information about a plurality of types of communication cables;
- a second gathering unit configured to gather cable information about the communication cables connected to the second connector of the communication apparatus;
- a second extraction unit configured to extract a communication setting value corresponding to the communication cable that is connected, from the communication setting information, based on the gathered cable information;
- a second setting unit configured to set the extracted communication setting value, to a relay apparatus to which the second connector is connected;
- a second activation unit configured to activate a port of a second communication switch to which the relay apparatus is to be connected; and a second synchronization unit configured to cause the control apparatus to carry out an activation of a port of a first communication switch provided at the control apparatus, in synchronization with the activation of the port of the second communication switch by the second activation unit.

10. The management apparatus according to claim 9, wherein the second synchronization unit comprises a second synchronization request notification unit configured to send a second synchronization request notification to the control apparatus, for instructing the activation of the port of the first communication switch, at a time when the second activation unit carries out the activation of the port of the second communication switch.

* * * * *